(12) United States Patent
Ingham (10) Patent No.: US 8,127,691 B2
(45) Date of Patent: Mar. 6, 2012

(54) SMC PALLET (75) Inventor: Terry L Ingham, Oxford, MI (US)

(73) Assignee: Fitzpatrick Technologies, LLC, Sterling Heights, MI (US)

( * ) Notice: Subject to any disclaimer, the term of this patent is extended or adjusted under 35 U.S.C. 154(b) by 1432 days.

(21) Appl. No.: 10/792,458

(22) Filed: Mar. 3, 2004

(65) Prior Publication Data

US 2005/0193929 A1    Sep. 8, 2005

(51) Int. Cl.
B65D 19/38 (2006.01)
(52) U.S. Cl. .................... 108/57.25; 108/901
(58) Field of Classification Search ............... 108/56.3, 108/57.25, 901, 902, 57.26, 57.27, 57.28
See application file for complete search history.

(56) References Cited

U.S. PATENT DOCUMENTS

| 1,696,585 | A |   | 12/1928 | Shepard, Jr. et al. |   |
|---|---|---|---|---|---|
| 2,503,022 | A |   | 4/1950 | Benoist et al. |   |
| 3,126,843 | A |   | 3/1964 | De Laney |   |
| 3,628,468 | A |   | 12/1971 | Angelbeck, Jr. |   |
| 4,145,975 | A |   | 3/1979 | Colbert |   |
| 4,159,681 | A |   | 7/1979 | Vandament |   |
| 4,240,358 | A |   | 12/1980 | Munroe | 108/57.2 |
| 4,397,247 | A |   | 8/1983 | Lemelson |   |
| 4,451,528 | A | * | 5/1984 | Krause | 428/300.4 |
| 4,488,862 | A |   | 12/1984 | Epel et al. |   |
| 4,535,110 | A |   | 8/1985 | Iseler et al. |   |
| 4,551,085 | A |   | 11/1985 | Epel et al. |   |
| 4,612,149 | A |   | 9/1986 | Iseler et al. |   |
| 4,622,324 | A |   | 11/1986 | Klessing et al. |   |
| 4,855,097 | A |   | 8/1989 | Iseler et al. |   |
| 4,867,924 | A |   | 9/1989 | Schilkey et al. |   |
| 5,052,307 | A |   | 10/1991 | Morrison |   |
| 5,123,359 | A |   | 6/1992 | DelBalso |   |
| 5,130,071 | A |   | 7/1992 | Iseler et al. |   |
| 5,175,692 | A |   | 12/1992 | Mazouz et al. |   |
| 5,249,917 | A |   | 10/1993 | Neumann et al. |   |
| 5,298,098 | A |   | 3/1994 | Hoedl |   |
| 5,351,628 | A |   | 10/1994 | Breezer et al. | 108/56.1 |
| 5,370,521 | A |   | 12/1994 | McDougall |   |
| 5,660,427 | A |   | 8/1997 | Freeman et al. |   |
| 5,673,629 | A |   | 10/1997 | Ginnow |   |
| 5,676,063 | A |   | 10/1997 | Wallace |   |
| 5,687,652 | A | * | 11/1997 | Ruma | 108/57.25 |
| 5,720,229 | A |   | 2/1998 | Schrage |   |
| 5,756,017 | A | * | 5/1998 | Togawa et al. | 264/40.1 |
| 5,960,721 | A |   | 10/1999 | Huetteman et al. |   |

(Continued)

FOREIGN PATENT DOCUMENTS

DE          4026786      *  2/1992

(Continued)

OTHER PUBLICATIONS

Encyclopedia of Polymer, Sheet Molding Compounds, vol. 15, pp. 167-176.

*Primary Examiner* — Hanh V Tran
(74) *Attorney, Agent, or Firm* — Harness, Dickey & Pierce, P.L.C.

(57) ABSTRACT

A pallet made of sheet molding compound (SMC) preferably includes a lower deck having unidirectional fibers therein and an upper deck having randomly oriented fibers therein. The upper and lower decks are assembled by heat staking the decks together with thermoplastic blocks.

2 Claims, 11 Drawing Sheets

U.S. PATENT DOCUMENTS

| | | | |
|---|---|---|---|
| 6,021,721 A * | 2/2000 | Rushton | 108/56.3 |
| 6,199,488 B1 | 3/2001 | Favaron et al. | |
| 6,237,509 B1 | 5/2001 | Ishido et al. | |
| 6,251,323 B1 | 6/2001 | Hoedl et al. | |
| 6,283,044 B1 | 9/2001 | Apps | 108/57.25 |
| 6,389,990 B1 * | 5/2002 | Apps | 108/57.25 |
| 6,448,307 B1 | 9/2002 | Medoff et al. | |
| 6,560,840 B1 | 5/2003 | Jenkins et al. | |
| 6,564,725 B2 * | 5/2003 | Hale | 108/57.25 |
| 6,622,641 B2 | 9/2003 | Smyers | |
| 6,622,642 B2 | 9/2003 | Ohanesian | |
| 6,632,387 B2 | 10/2003 | Archuletta et al. | 264/115 |
| 6,644,219 B2 | 11/2003 | Apps | |
| 6,651,799 B1 | 11/2003 | Rice et al. | |
| 6,838,148 B1 * | 1/2005 | Ehnert et al. | 428/109 |
| 2002/0077394 A1 | 6/2002 | Gungumus et al. | |
| 2003/0032708 A1 | 2/2003 | Scarlette | |
| 2003/0075840 A1 | 4/2003 | Hahn et al. | |
| 2003/0106470 A1 | 6/2003 | Apps et al. | |
| 2003/0183133 A1 | 10/2003 | Dehennau et al. | |
| 2003/0187102 A1 | 10/2003 | Medoff et al. | |

FOREIGN PATENT DOCUMENTS

GB  2231552  * 11/1990

* cited by examiner

SMC PALLET

FIELD OF THE INVENTION

The present invention relates to a reinforced fiber SMC pallet, and a method for making the same.

BACKGROUND OF THE INVENTION

The common wooden and plastic industrial pallets are generally known in the art. Such pallets, however, have several shortcomings in regards to both the limitations of their uses, and their manufacture. Wooden pallets are heavy and difficult to manufacture. They are typically constructed by sandwiching wooden blocks between two similar decks or surfaces. The surfaces may either be made of a continuous sheet, or more commonly, have a plurality of wooden boards typically arranged in a parallel manner. In general, the surfaces and blocks are stacked or arranged to provide apertures suitable for access by the forks of a forklift truck or pallet jack from at least one side. Since the aesthetic appearance of a pallet may not outweigh the cost, it may include scrap or recycled wood. Often, the size variations in the wooden boards may lead to inconsistent dimensions. Inconsistent dimensions may impede an automated manufacturing process.

By its nature, the wood may be subject to swelling, warping, shrinkage, splintering, deterioration and fungal or bacterial growth after exposure to moisture and other elements. If the wooden pallets are assembled with nails, this may lead to the further problems of potential cargo damage from loose nails, rust formation and the hazardous and/or sanitation problems accompanying the corrosion. Many manufacturing environments require a level of sanitation that wooden pallets simply can not provide.

Attempts to overcome the drawbacks of wooden pallets with plastic pallets have been faced with similar shortcomings. Prior art designs of plastic pallets have had to deal with issues such as the trade off between the cost and weight bearing capability. Typically, plastic pallets designed with a significant weight bearing capability have tended to be both heavy and expensive. In the same manner, inexpensive plastic pallets have had both strength and durability issues. Certain thermoplastic pallets have utilized steel support and reinforcing structures encapsulated in the plastic material. The incorporation of steel with the pallet adds to the cost of construction, and creates an additional step in the manufacturing process.

It is therefore desirable to provide a long-life pallet with outstanding physical attributes that is relatively inexpensive and can be manufactured with relative ease. Specifically, it is desirable to provide a pallet that meets and exceeds stringent standards, including the needs and requirements of the USDA, FDA, NSF and Grocery Manufacturers Association (GMA).

SUMMARY OF THE INVENTION

The present invention provides a pallet having an upper deck, a lower deck, and a plurality of members connecting the upper and lower decks together to form a pallet. It is an object of the present invention that at least one of the decks are made of sheet molding compound (SMC). The SMC includes a thermosetting resin and reinforcing fibers therein. Preferably, the upper deck has a randomly oriented fiber orientation, and the lower deck has unidirectional fibers aligned substantially parallel to its frame and cross-members connected therebetween.

The present invention also relates to a method of making a pallet. The method includes aligning and placing a plurality of thermosetting resin SMC charges into a desired mold. The mold is closed, thereby compressing the SMC charges under sufficient heat and a pressure causing the charges to flow and fill the mold. The compressed SMC charge is polymerized and a first deck is removed from the mold. A molding process is repeated forming second deck, preferably by the same method as the first deck. A plurality of intermediate members, or blocks, are arranged between the first and second deck, and are staked in place to form an SMC pallet.

In another method embodiment, more specifically, the present invention provides a method of providing an SMC deck having a thermosetting resin and a plurality of unidirectional aligned fibers therein. SMC charges are oriented in a mold to form a rectangular frame with longitudinally and laterally extending cross-members. The SMC charges are compressed under heat and pressure to polymerize the thermosetting resin and form a lower deck with unidirectional fibers extending parallel along the frame and cross-members. A second plurality of SMC charges are compressed under heat and pressure to form an upper deck. The upper and lower decks are connected together with blocks to form an SMC pallet.

In a preferred version of the second method, the blocks include posts extending therefrom and the upper and lower decks have openings therein. The block posts are inserted into the openings so that portions of each post protrude from opposing surfaces of the decks. The protruding posts are then heat staked, causing them to melt and to form, thereby securing the decks to the blocks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements.

Figure 1:
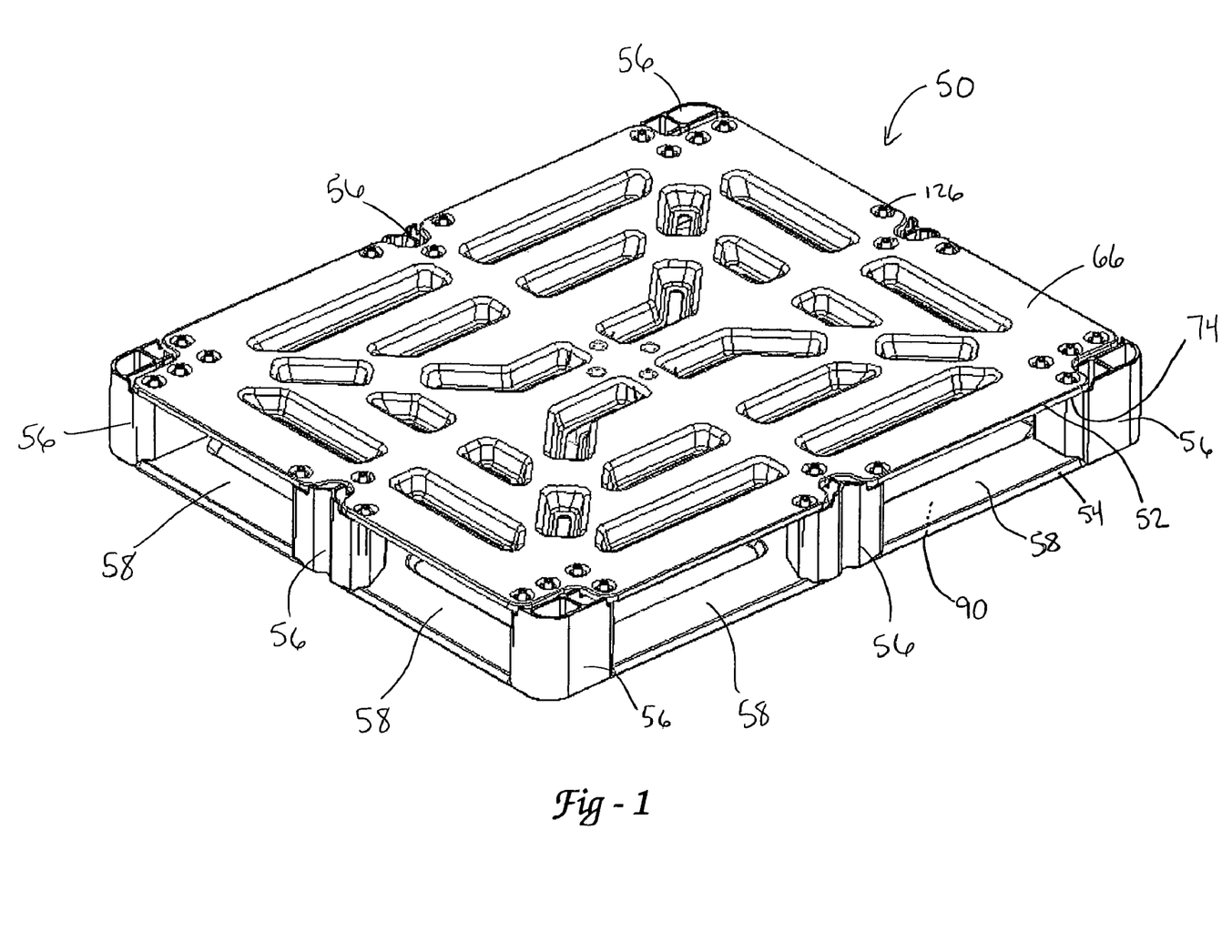
FIG. 1 is a top perspective view of an assembled pallet made in accordance with the teachings of the present invention.
Figure 2:
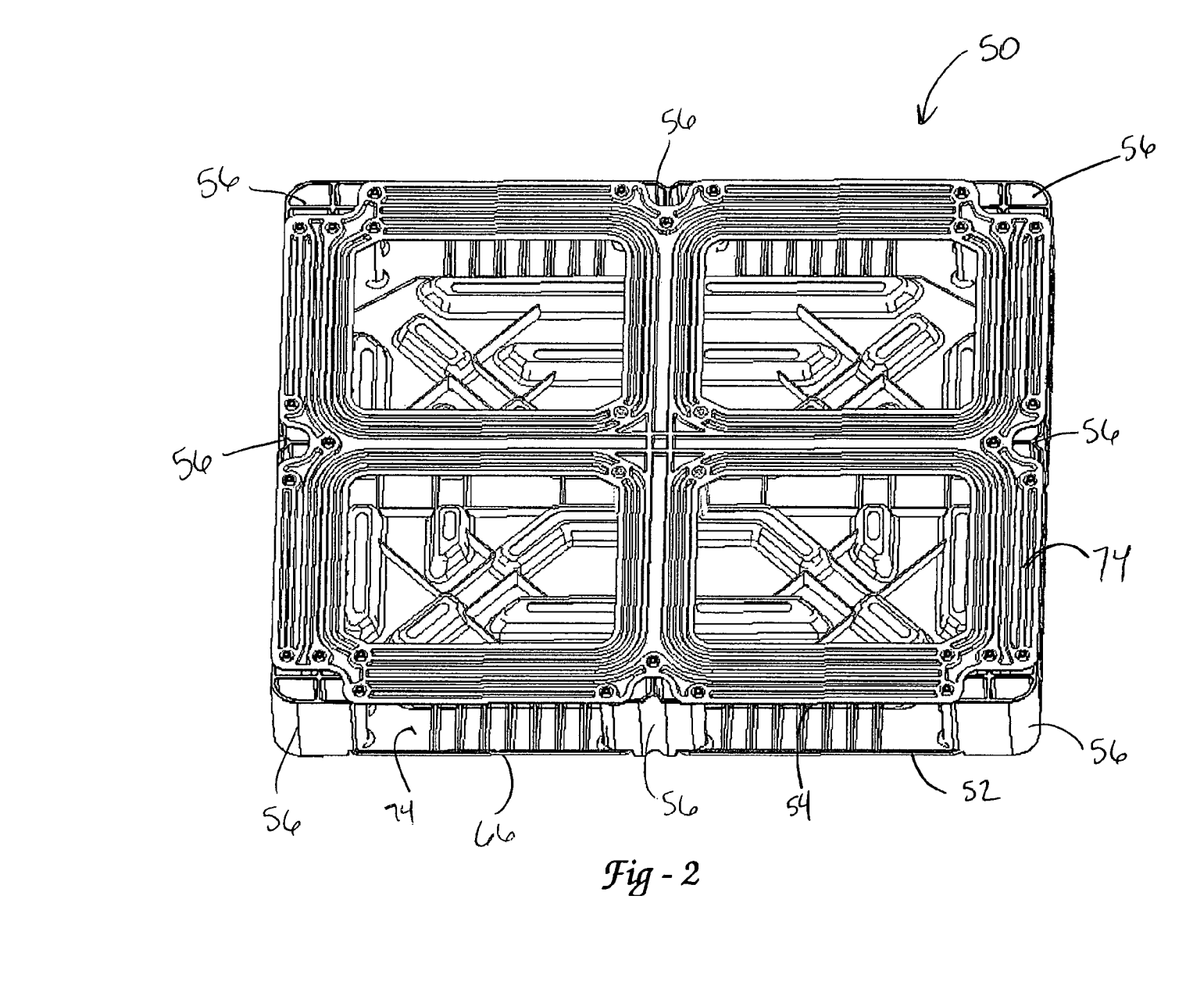
FIG. 2 is a bottom perspective view of the pallet.

As shown in FIG. 1 and generally referenced by the number 50, the pallet of the present invention has four peripheral edges defining the perimeter. Preferably each side is disposed at a substantially right angle, thereby forming a rectangular shape. FIG. 2 depicts the bottom perspective view of the assembled pallet of the present invention. In the preferred embodiment, the pallet is constructed having the industry standard size and dimensions, which is currently 40 by 48 inches (1.0 by 1.2 m), although it may be made in any desired size or shape. The pallet 50 includes an upper deck 52 and lower deck 54, each being formed of a sheet molding compound (SMC) that includes a thermosetting resin and reinforcing fibers therein. The upper and lower decks are held together with a plurality of blocks, generally referenced as number 56. SMC is a polymeric composite material. The preferred SMC of the present invention includes a thermosetting resin, a thermoplastic polymer, various inert fillers, fiber reinforcements which typically consist of glass or graphite fibers, a polymerization initiator, maturation agent(s), and lubricant(s).

The term "thermosetting resin", as used herein, refers to plastics (e.g., organic polymers) that are cured, set, or hardened into a permanent shape. Curing is an irreversible chemical reaction typically involving molecular cross-linking using heat or irradiation (e.g., UV irradiation). Curing of thermosetting materials can be initiated or completed at, for example, ambient or higher temperatures. The cross-linking that occurs in the curing reaction is brought about by the linking of atoms between or across two linear polymers, resulting in a three-dimensional rigidified chemical structure. Common resins may include urethanes, polyesters and vinyl esters. Resins may be selected depending on the specific pallet design, load capacity, and other requirements. The reinforcing fibers used in the present invention preferably include inorganic fibers, more preferably the fibers include glass fibers. Typical fibers of will have a range of length from about 0.5 to about 2 inches, preferably the fibers will have a length of about 1 inch. In a preferred embodiment, typical fibers of the lower deck 54 will additionally comprise continuous, unidirectional aligned fibers which extend substantially the entire length of each side of the frame and the cross-members of the pallet. Typical lengths of the continuous fibers will have a range of about 40 to about 48 inches, corresponding to the length and width of the pallet, respectively.

Figure 3:
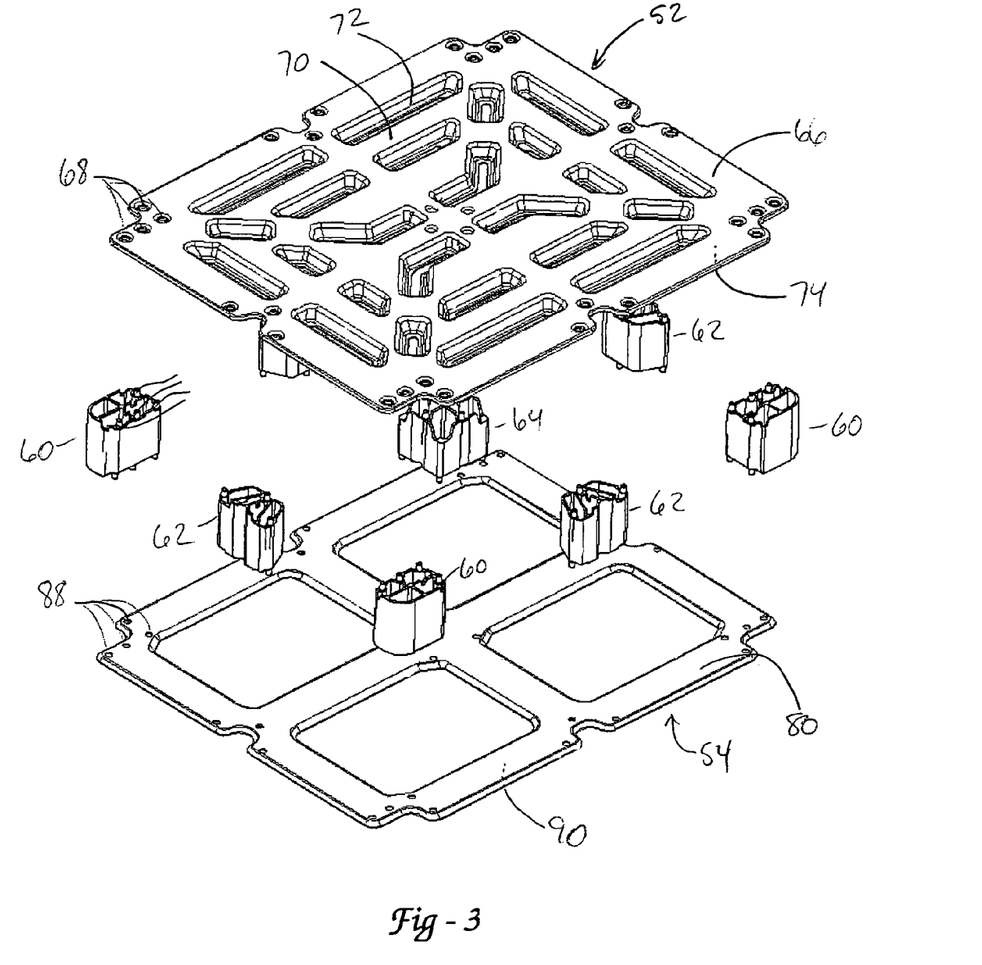
FIG. 3 is an exploded perspective of the pallet of FIGS. 1 and 2, showing the individual components thereof, and which comprise a preferred kit of parts according to the present invention.

FIG. 3 depicts an exploded perspective view of the pallet of FIGS. 1 and 2, showing the individual components spaced apart from each other, and which comprise an upper deck 52, a lower deck 54, and a plurality of separating members, or blocks 56. Preferably, there are nine blocks, aligned in three rows of three, defining two apertures 58 on each side of the pallet. Ideally, each pallet has four corner blocks 60, four mid-side blocks 62, and one center block 64. The size of the apertures 58 will depend upon the size and length of the blocks 56. Preferably, the blocks 56 are of a sufficient size so that the apertures 58 define a space suitable for access by the tines, or forks, of a forklift truck or pallet jack from any of the four sides of the pallet. The current industry standard is an aperture 58 with a separation distance of about 3.5 inches between the upper deck 52 and lower deck 54. Each block 56 holds the upper and lower decks together, while bearing and distributing the loads placed on the upper deck 52. In the preferred embodiment, the blocks 56 are heat staked to the upper and lower decks.

Figure 4:
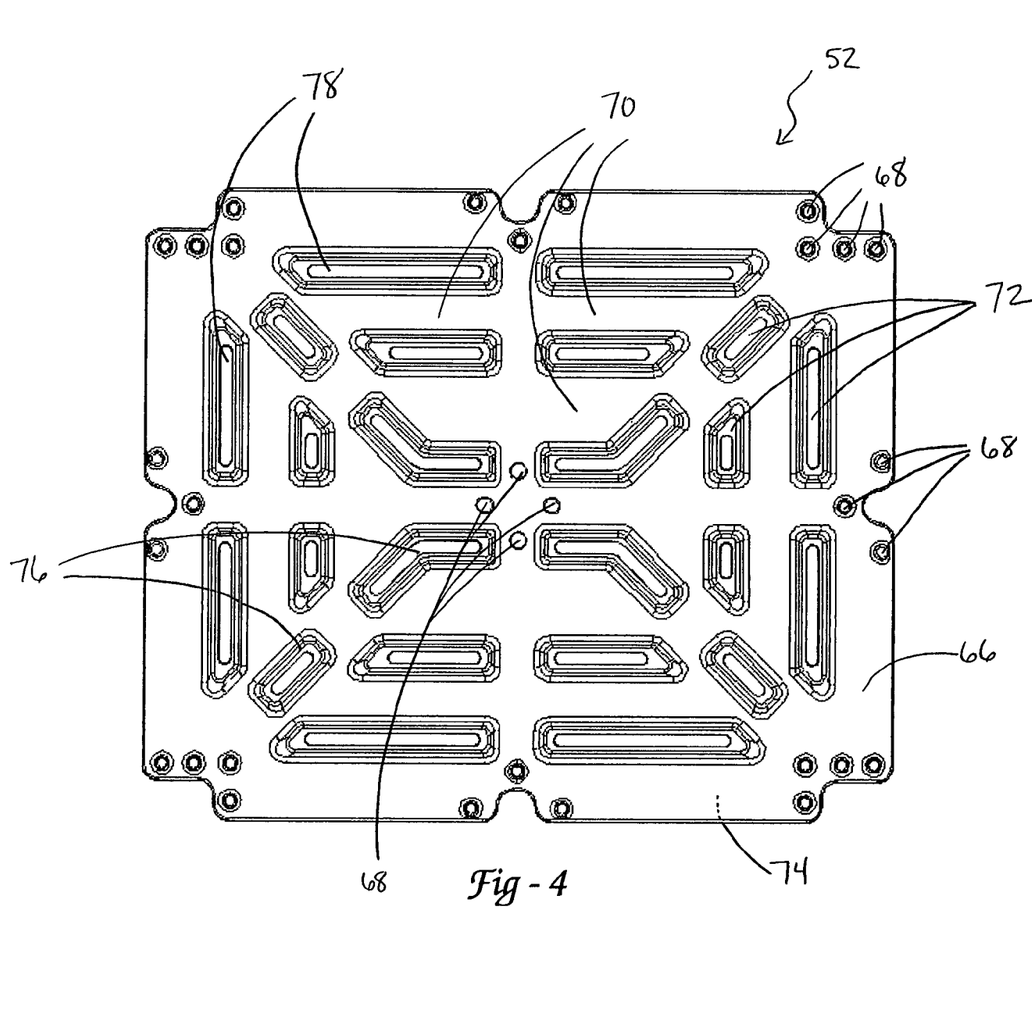
FIG. 4 is a top plan view of the upper deck of the pallet.

FIG. 4 is a top plan view of the upper deck 52 of the pallet. As shown therein, upper deck 52 has a generally planar load bearing surface 66 upon which objects and goods may be positioned for transport and storage. Upper deck 52 has a plurality of openings 68 in the center, corners, and in the mid-side regions. These openings 68 are operable to mate and join with the respective intermediate blocks 56 that will connect the upper deck 52 with the lower deck 54. The openings 68 may be punched, pierced, or drilled through the deck 52 as known in the art. SMC upper deck 52 is preferably formed with one or more SMC charges, although other constructions could be employed. Preferably, the charges for making the upper deck 52 contain randomly oriented and sized fibers.

Figure 5:
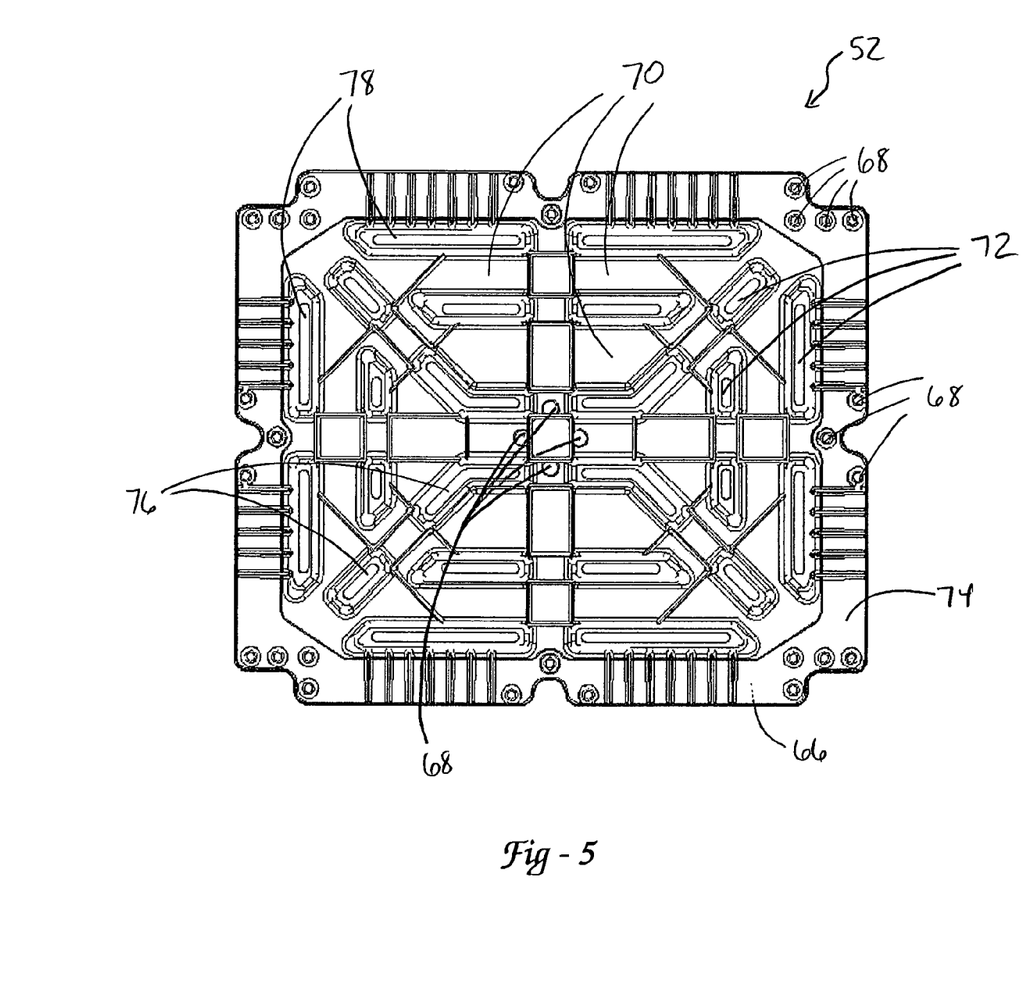
FIG. 5 is a bottom plan view of the upper deck of the pallet.

A number of indentations and projections such as ridges 70 and channels 72 may be formed in the top of the upper deck, with complementary features being defined in the opposite surface, or lifting surface 74 as shown in FIG. 5, during molding. These ridges 70 and channels 72 are preferably arranged as providing additional strength, support and resistance to flexing, bending or buckling of the upper deck 52. They may also allow for the drainage of any liquids which may accumulate thereon, and alternate embodiments may include further channels directing fluid to the sides of the pallet (not shown). A preferred arrangement of the ridges 70 and channels 72 is provided in FIG. 4, which shows at least one set of channels 76 extending from the center of the pallet toward each corner. Further channels 78 are defined generally forming nested rectangles, following the substantially rectangular shape of the pallet. The channels preferably have a tapered cross section, with an angle of taper preferably between 5 to 10 degrees from vertical. It should be noted, however, that the number, orientation, size and shape of the ridges and channels can be varied in many alternate configurations for optimized strength and air flow. The configuration of the channels 72 and ridges 70 is intended to increase the load bearing strength of the pallet while minimizing the creation of any area that may be subject to structural failure or weakness. Of course, upper deck 52 may also have a continuous surface without apertures if so desired.

As shown in FIG. 4, the top surface of upper deck 52 is generally smooth and flat. In an alternate embodiment, however, the load bearing surface 66 may have a texture or an etched or imprinted geometrical pattern thereon (not shown) during its formation which would act as a non-skid surface to prevent objects from sliding during transport. Alternatively, any suitable type of friction tape, or friction coating may be applied or laminated to the load bearing surface 66 in order to help prevent movement of objects on the pallet 50.

Figure 6:
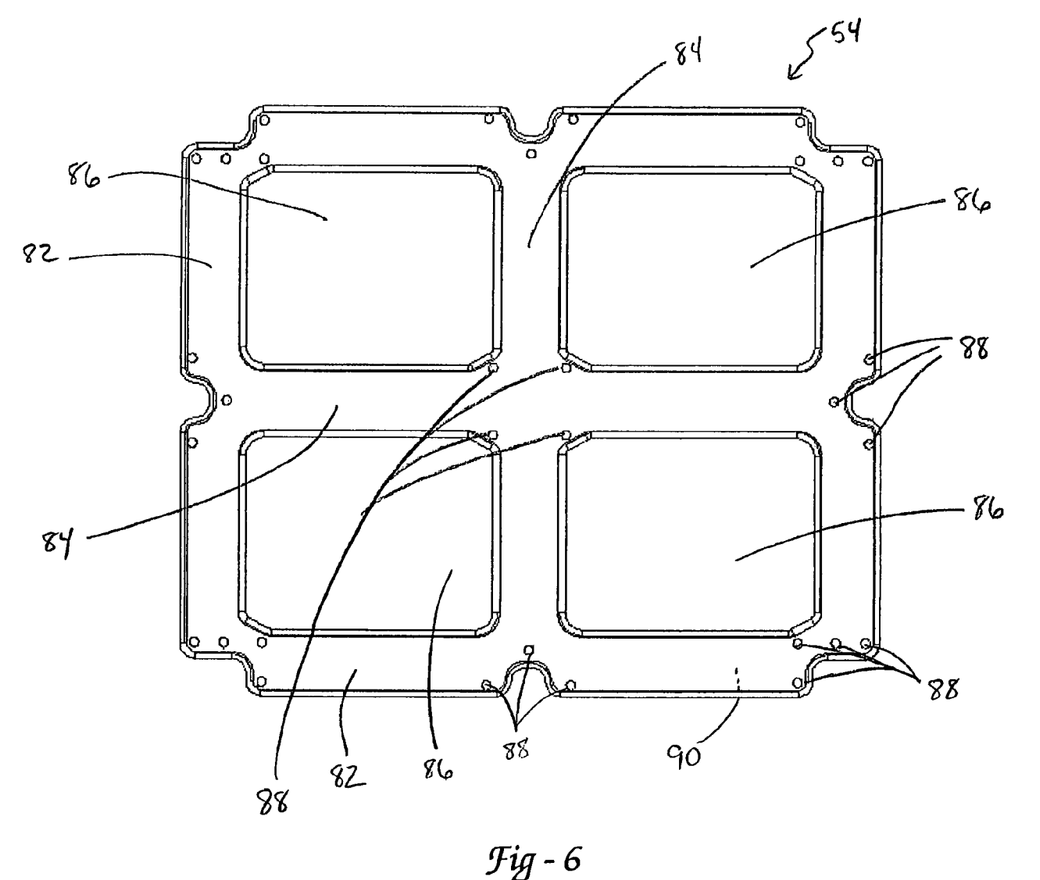
FIG. 6 is a top plan view of the lower deck of the pallet.

FIG. 6 depicts a top plan view of the lower deck 54 of the pallet having a substantially smooth and flat surface 80. Preferably, lower deck 54 includes a rectangular outer frame 82 with longitudinally and laterally extending cross-members 84 aligned and connected to the center of each side of frame 82. As shown, the preferred arrangement of the cross-members defines four relatively large apertures 86 for accommodating pallet jacks. While shown as substantially rectangular in shape, apertures 86 may be sized and shaped for other desired applications. Additional cross-members may be used, depending upon the desired load capacity of the pallet 50. In alternate embodiments, the size and number of apertures 86 will depend upon the placement and number of cross-members used. Similar to the upper deck 52, lower deck 54 also has a plurality of openings 88 in the center, corners, and in the mid-side regions. As previously mentioned, these openings 88 are operable to mate and join with the respective intermediate blocks 56 that will connect and upper deck 52 with the lower deck 54.

Figure 7:
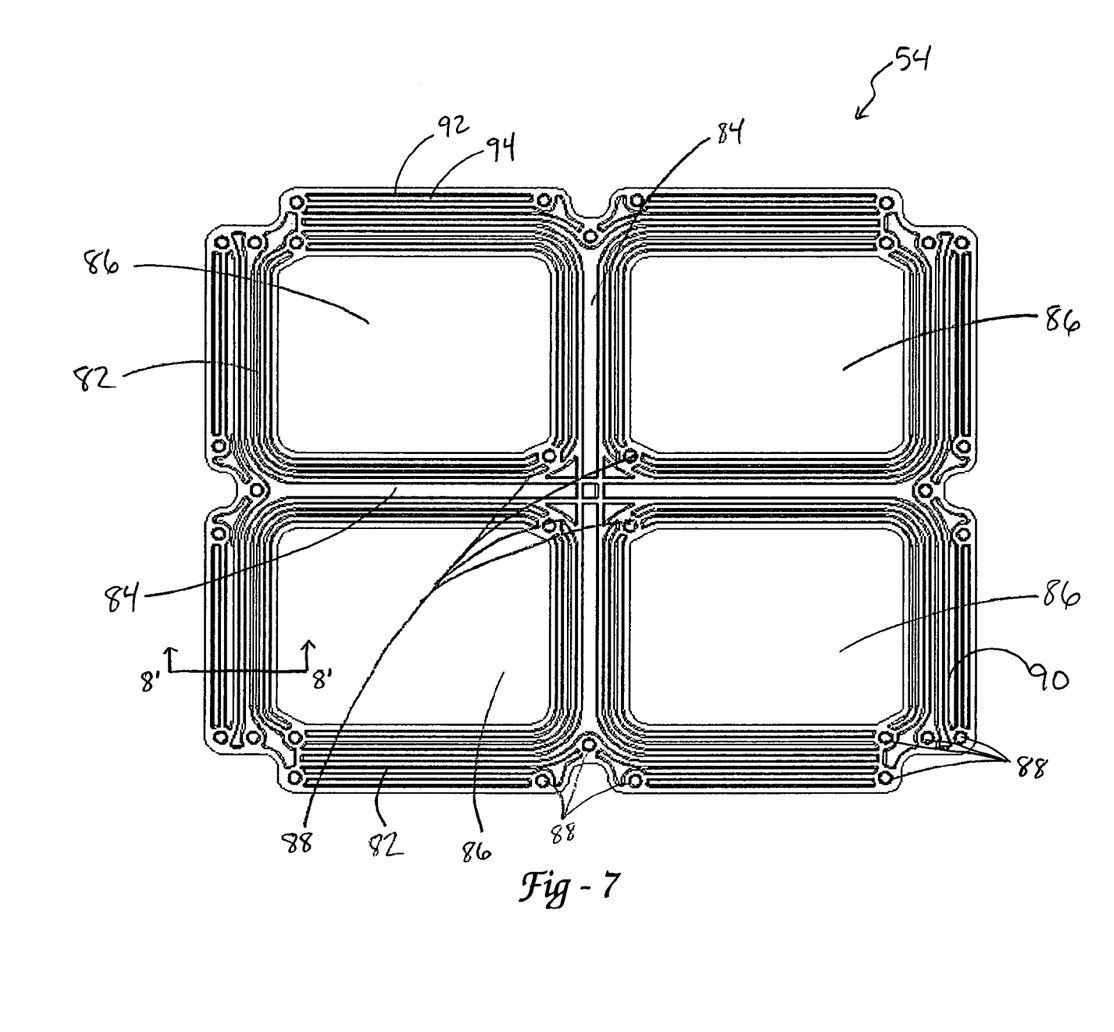
FIG. 7 is a bottom plan view of the lower deck of the pallet.

FIG. 7 depicts a bottom plan view of the lower deck 54. As shown therein, the lower deck 54 includes a substantially planar bottom surface 90 for the secure placement of the pallet on the ground or other resting surface. This also allows for the stable stacking of the pallet onto a similarly designed pallet. In the preferred embodiment, the lower deck 54, including the frame 82 and cross members 84, has a built-in reinforcements provided by a plurality of alternating supporting members, or integrated ribs 92 with channels 94.

As previously discussed, the preferred SMC lower deck 54 is constructed having continuous, unidirectional aligned reinforcing fibers which extend substantially parallel to and run along with the direction of the frame 82 and the cross-members 84 of the lower deck 54. The SMC charges used for the lower deck will preferably contain a mixture of about 20-40% by weight continuous uni-directional fibers, and about 10-30% by weight randomly sized and oriented fibers. The continuous, uni-directional fiber alignment provides exceptional strength and support, and increases the stability and load bearing strength. In addition, the uni-directional alignment provides superior material properties such as a tensile modulus of about 27.0 GPa, a Poisson's ratio of about 0.34, a specific gravity of about 1.85, and a tensile strength of about 370 MPa.

Figures 8A, 8B:
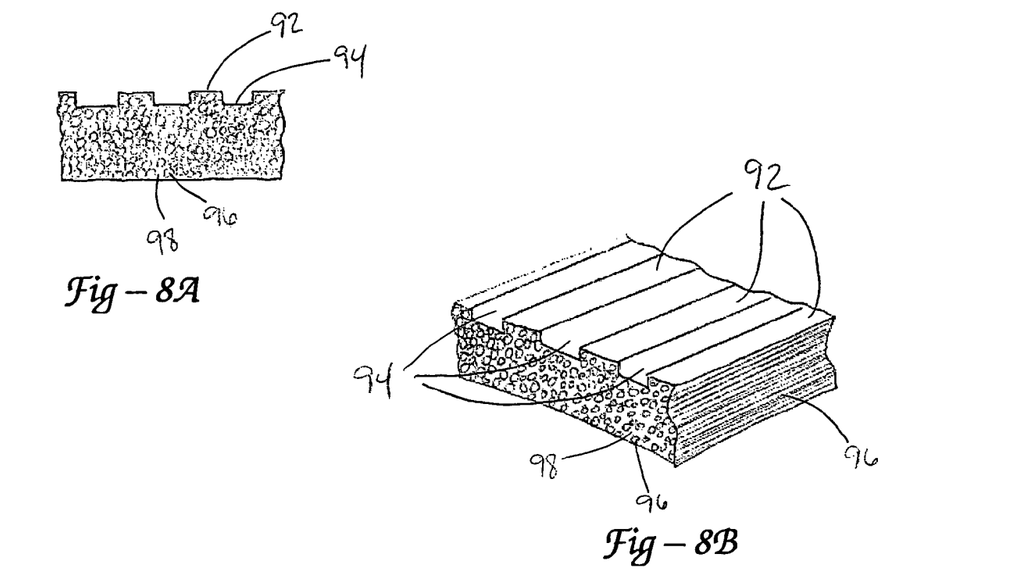
FIG. 8A is a partial cross sectional view of the lower deck of the pallet of FIG. 7 taken along the line 8'-8'.
FIG. 8B is a partial three dimensional perspective view of the cross sectional view of FIG. 8A.

FIG. 8A shows a cross sectional view of the frame 82 of FIG. 7 taken along the line 8'-8'. During the molding process, ribs 92 and channels 94 are formed in and orthogonally extend from the frame 82 and cross-members 84. The reinforcement fibers run across the entire frame perimeter and is incorporated with the cross-members as depicted in FIG. 7. The size and pattern configuration of the ribs 92 and channels 94 can vary as necessary. The integrated ribs 92 and channels 94 are preferably arranged as providing optimal strength, support and resistance to flexing, bending or buckling of the lower deck 54. FIG. 8B is a three dimensional perspective view of the cross sectional view of FIG. 8A. As previously mentioned, the unidirectional fibers 96 of FIGS. 8A and 8B are positioned in the cured thermosetting resin 98, and run with and are parallel to the frame 82 and cross-member 84 sections.

The thickness and density of the SMC decks may be varied depending on the load characteristics and strength requirements of the pallet. In the preferred embodiment, the decks have a gradient-type surface thickness, with edges and other high stress point areas having the thickest regions. It is preferable that the thickness of the SMC upper deck 52 range between about 2 and 7 millimeters, more preferably between about 3 and 5 millimeters. Likewise, it is preferable that the thickness of the lower deck 54 range between about 4 and 10 millimeters, more preferably between about 4 and 8 millimeters.

Figure 9:
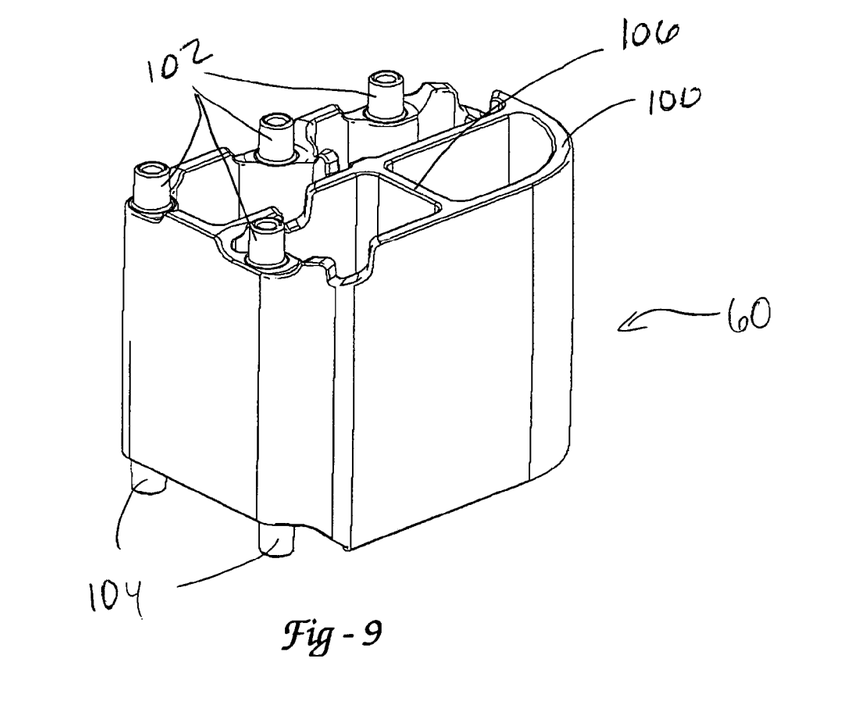
FIG. 9 is a perspective view of a corner block of the pallet.
Figure 10:
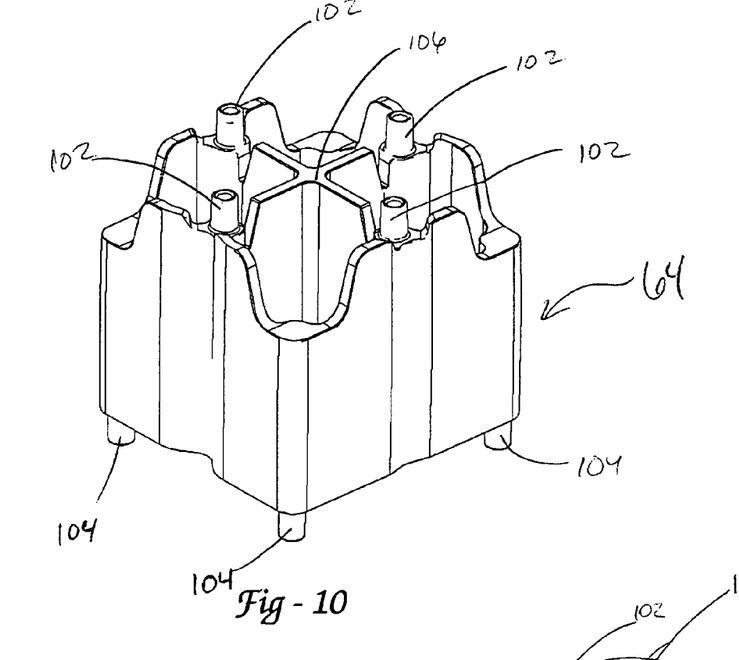
FIG. 10 is a perspective view of a center block of the pallet.
Figure 11:
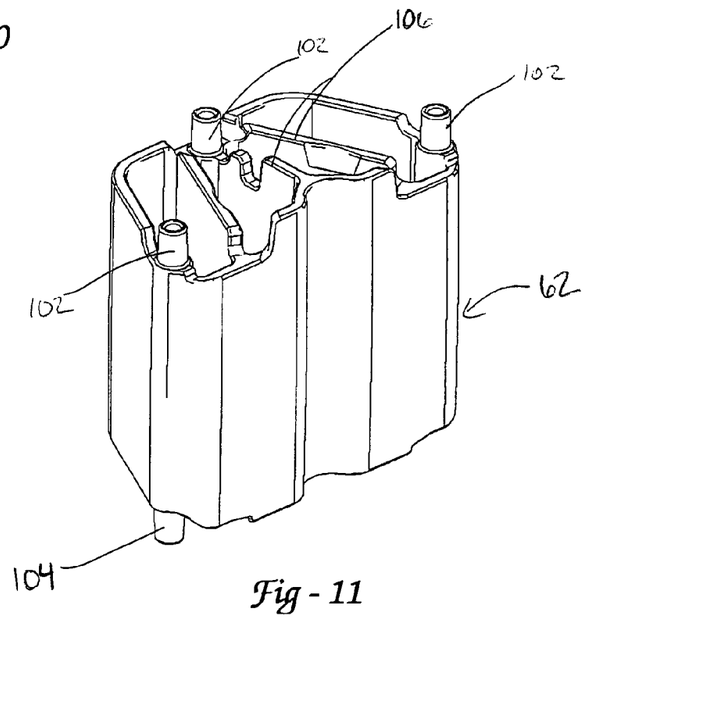
FIG. 11 is a perspective view of a mid-side block of the pallet.

FIGS. 9, 10 and 11 depict the center, mid-side and corner supporting blocks, respectively. It is desirable that the supporting blocks 56 be made of a material capable of withstanding the high impact of truck tines or forks driven into them as a result of misalignment. The blocks 56 are preferably formed of a High Density Polyethlyene (HDPE) material, with walls of a suitable relatively constant thickness to additionally accommodate any edge drop impact. In alternate embodiments. However, any suitable or practical material could be used, including but not limited to other desired plastics, composites, or mixtures thereof. For additional impact resistance, the corner blocks 60 have been designed with curved edges 100, thereby minimizing potential damage which may occur upon collision or brunt contact. Each block 56 includes a plurality of top posts 102 and bottom posts 104, located on both the top and bottom portions of the blocks 56, respectively. Blocks 56 may also have various supporting walls 106 therein for added rigidity and support.

It should be understood by those skilled in the art that while the block posts 102, 104 and the deck openings 68, 88 are illustrated as being cylindrical and circular, respectively, it is possible for an alternate block post to have various symmetrical or asymmetrical geometries and alternate deck openings may have corresponding shapes to mate with the specific block post design.

Like with most thermoset polymeric materials, the SMC pallet is inert compared with many thermoplastic polymers. The SMC pallet has excellent resistance to chemicals, including strong solvents. The heat deflection temperature is generally above 200° C., and like other thermoset materials it has superior dimensional stability. Combined with unidirectional aligned glass fibers, the SMC pallet has a preeminent strength to weight ratio of about 200. SMC Pallet material benefits include a light weight modular design that is OHSA compatible. The thermoset resin may contain various functional fillers; non-limiting examples include: fire retardants, colorants, carbon fiber, metal fiber, and biodegradation agents, etc. Additionally, the SMC pallet is recyclable to itself as a filler. It is designed for food compliance (FDA, USDA, and NSF) and is not moisture or odor absorbent. The SMC pallet also has the capability of being fitted with RFID technology.

Pallets facilitate the flow of products in the grocery industry. Accordingly, they are monitored under increased scrutiny. A summary of the Grocery Manufacturers Association (GMA) design requirements for pallets is shown in Table 1. Approved pallets must meet the design criteria for maximum displacement of the pallet edges, and the maximum stress at specified loads for each edge of a 40 by 48 inch (1.0 by 1.2 m) pallet. The Edge Rack Support is a variable measured to determine the maximum pallet deflection during long-term creep, and accesses the pallet bending strength when the pallets are edge racked. The Short Span Support is the maximum pallet deflection during long-term creep, and accesses the pallet bending strength when the rack supports are not at the pallet edges. The Fork Tine Support is the maximum pallet deflection during short-term creep, and accesses the pallet bending strength when the pallets are supported by fork handling equipment. The Stacked Load Support is maximum pallet deflection of the bottom pallet in a stack during long-term creep, and accesses the pallet bending strength when the pallets are block stacked. The Conveyor Support is the maximum pallet deflection during long-term creep, and accesses the pallet bending strength when the pallet is supported on short-span chain or long-span roller conveyors. The SMC pallet of the present invention meets and exceeds all of the GMA requirements for pallet design.

TABLE 1

GMA Design Requirements

| Design Validation Test | Edge Length (m) | Maximum Displacement (mm) | Maximum Stress (MPa) |
|---|---|---|---|
| Edge Rack Support | 1.0 | 20.4 | 62.7 |
| (1,270 kg load) | 1.2 | 20.4 | 62.4 |
| Short Span Support | 1.0 | 20.4 | 119 |
| (1,270 kg load) | 1.2 | 20.4 | 118 |
| Fork Tine Support | 1.0 | 10.2 | 19.4 |
| (1,587 kg load) | 1.2 | 10.2 | 20.9 |
| Stacked Load Support - Top Deck (7,300 kg load) | 1.0/1.2 | 7.62 | 149 |
| Conveyor Support | 1.0 | 10.2 | 126 |
| (5,840 kg load) | 1.2 | 10.2 | 125 |

Figure 12:
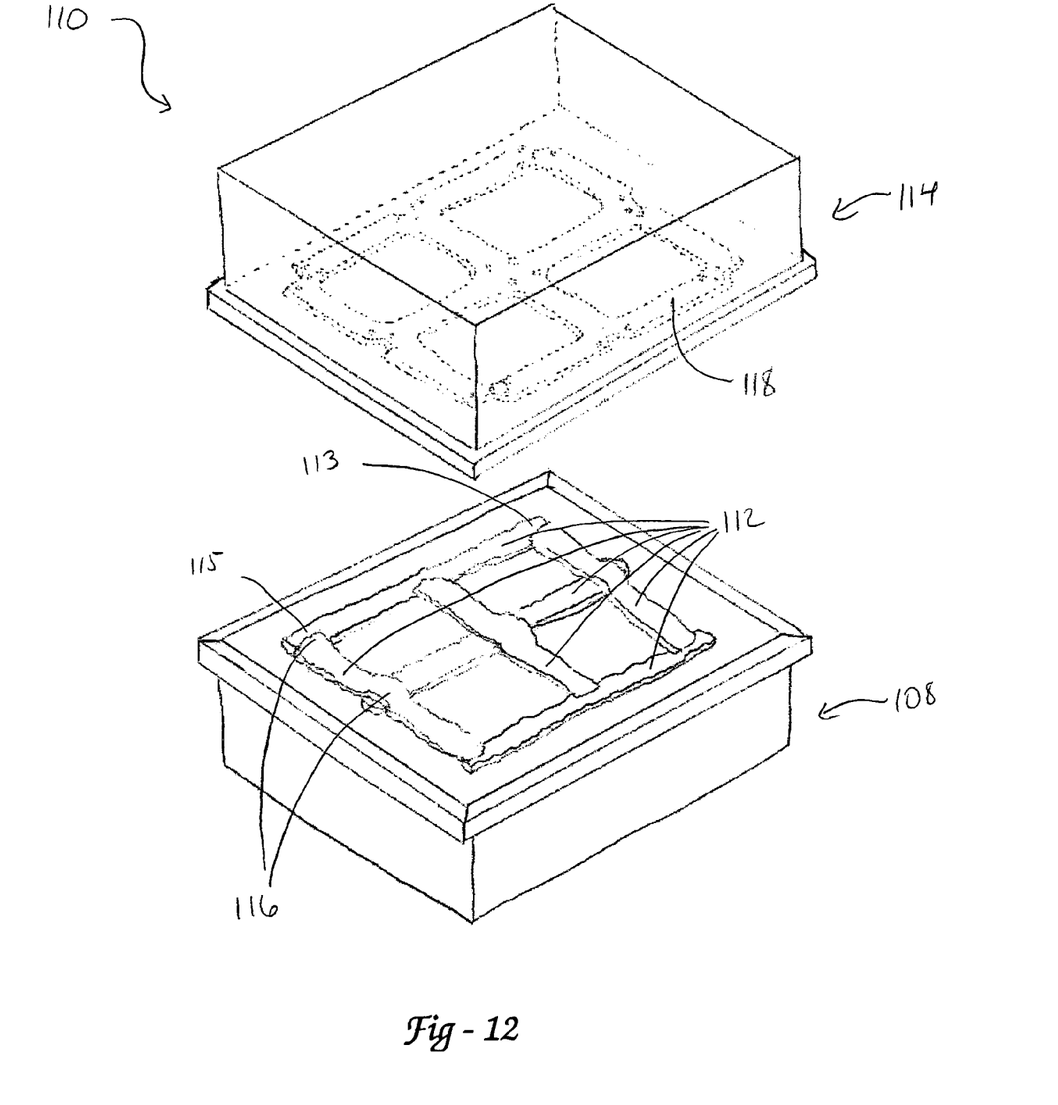
FIG. 12 is a perspective view of a compression mold for making the decks of the pallet from SMC charges.

Focus is now directed to the method of making pallet 50 of the present invention with upper and lower decks being made of SMC. According to the preferred method, lower deck 54 is made by first placing a plurality of SMC charges 112 onto the lower die 108 of an SMC mold 110 as shown in FIG. 12. The SMC charges 112 have a thermosetting resin and contain a plurality of continuous, unidirectional fibers running the length of each charge, as shown in FIG. 12 from end 113 to end 115. As previously discussed, preferably, about 30-60% of the compound will consist of randomly sized and oriented fibers. In the preferred embodiment, the fibers include glass fibers. The lower die 108 and upper die 118 of the mold 100 have complementary inner surfaces which, when closed, define the shape of the part being molded, as known in the art. Here, the SMC charges 112 are oriented by the operator onto lower die 108 forming a substantially rectangular frame with longitudinally and laterally extending cross-members. Charges 112 will overlap in certain areas 116, depending upon the design of the deck to be molded. It should be understood that SMC mold 110 may be equipped with seals and various other aspects common to an SMC mold and known to one skilled in the art (not shown). Exemplary examples of suitable SMC compression molds and resin formulations can be found in U.S. Published Patent 2003/0075840 and issued U.S. Pat. Nos. 4,488,862; 4,612,149; 4,855,097; 4,551,085; 5,130,071; 4,867,924; 5,370,521; 4,535,110 and 4,622,324, all of which are hereby incorporated by reference.

Once the charges are in place, the mold 110 is closed and the charges are compressed under heat and pressure sufficient to polymerize the thermosetting resin therein, forming a lower deck 54 with the continuous unidirectional fibers extending parallel along the frame 82 and the cross members 84. Upon application of the mold compression force, the randomly sized and oriented fibers contained therein will disperse throughout the deck, filling any openings the continuous, unidirectional fibers may leave.

The upper deck 52 of the SMC pallet 50 is formed in a similar manner. The upper deck mold will likewise have an upper and lower dies that will include corresponding features such as ridges and channels to be formed in the upper deck. A single charge, or a plurality of SMC charges may be placed in a mold similar to the placement method used in making the lower deck. Preferably, the charge(s) contain fibers having a substantially randomly oriented orientation. Once the charge(s) are in place, the mold is compressed and the appropriate heat and pressure is applied to polymerize the thermosetting resin therein and form an upper deck 52.

Figure 13A:
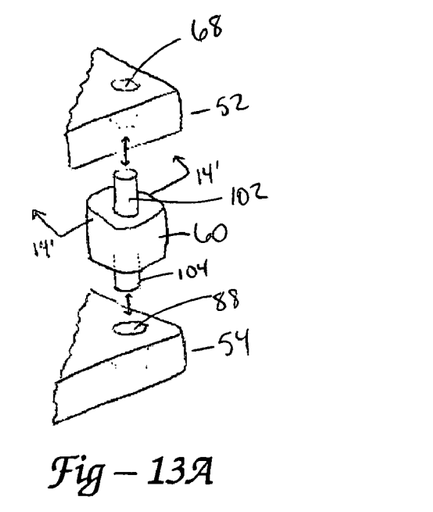
FIGS. 13A and 13B are enlarged partial perspective views of one corner of the pallet, illustrating the pallet components being aligned for assembly.
Figure 13B:
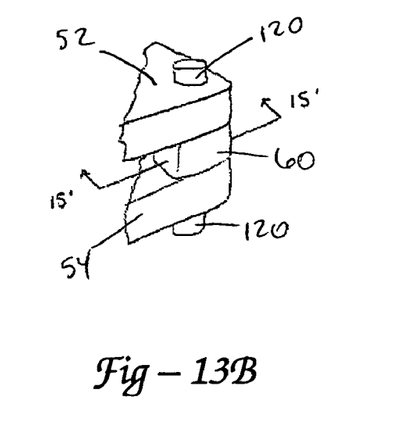

The assembly of the pallet includes aligning and securing the upper deck, the intermediate blocks, and the lower deck. FIGS. 13A and 13B depict an enlarged partial perspective view of a corner of the pallet being aligned for assembly. As shown, once the upper deck openings 68 are aligned with the upper block posts 102, the upper deck 52 is lowered in place over the upper block posts 102 of block 60. Likewise, once the lower deck openings 88 are aligned with the lower block posts 104, the lower deck 54 is raised in place under block 60. At this time, a portion 120 of each post should protrude from both decks as shown in FIG. 13B. The portion 120 should be sufficient in size and length to be deformed in a known manner to spread over a surface 122 of the decks around the openings 68, 88.

Each post is then deformed through the cold flow or melting of the plastic to form a head which mechanically locks the two decks together. The staking process is a resourceful technique having the advantages of being quick, economical and consistent. Unlike welding, staking has the capability of joining plastics to other materials (e.g. metal) in addition to joining like or dissimilar plastics. Staking further has the advantage over other mechanical joining methods in that it eliminates the need for common additional components such as rivets and screws.

There are four common methods of staking, namely cold staking, heat staking, thermostaking, and ultrasonic staking. The choice of the process is dependent upon the pallet component materials to be joined, the loads to which the pallet assembly will be subjected, and the desired cosmetic appearance. The accurate alignment of the pallet components is of the greatest importance. Some of the common design parameters include block post diameter, block post height and block post geometry. Due to the deformation of previously formed parts, staking is generally used with thermoplastic materials, such as HDPE.

Figure 14:
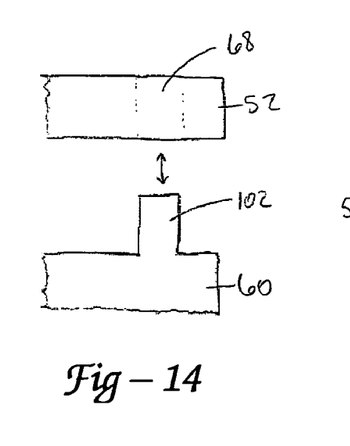
FIG. 14 is a cross sectional view of the pallet corner of FIG. 13A taken along the line 14'-14'.
Figure 15A:
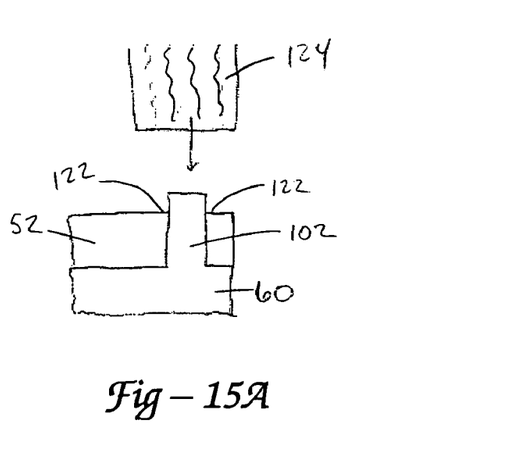
FIGS. 15A, and 15B are cross sectional views of the pallet corner of FIG. 13B taken along the line 15'-15', illustrating the heat staking process.
Figure 15B:
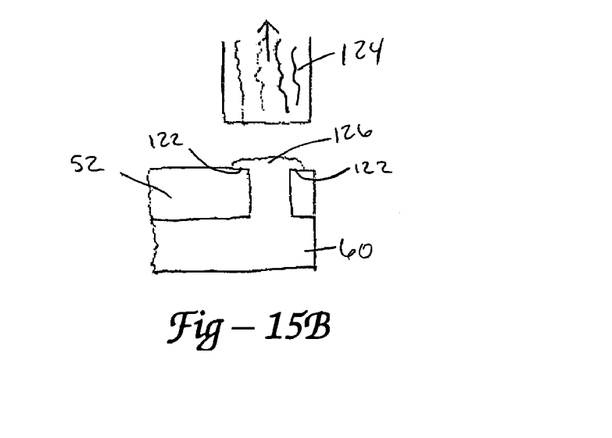

The preferred manufacturing assembly process is by heat staking and is best depicted by FIGS. 14, 15A and 15B. FIG. 14 is a partial cross sectional view of the line 14'-14' of FIG. 13A. FIGS. 15A and 15B are partial cross sectional views of the line 15'-15' of FIG. 13B. Once the post 102 and upper deck 52 are aligned, as shown in FIG. 14, a compression member 124 is heated, aligned, and lowered over the protruding block post 120 as shown in FIG. 15A. One of the advantages of heat staking is that little pressure is required to form a head 126 on the post 102. This widens the application of staking to a broader spectrum of thermoplastic materials than is possible with cold staking, including glass-filled materials. The compression member 124 is lowered to heat the protruding portion 120 of the post 102. It compresses the protruding post 120 to form head 126, as shown in FIG. 15B, thereby heat staking block 60 with the upper deck 52. The same heat staking process is performed on all of the block posts. The quality of the joint is dependent on control of the processing parameters: temperature, pressure, and time—a typical cycle time can typically be between about 1 and 5 seconds. Heat staking has the advantage that the pallet can be disassembled without irreparably damaging the upper and lower deck. It also has the flexibility to allow the simultaneous staking of a large number of posts, and to accommodate a variety of post head designs.

Alternative staking methods could be contemplated depending upon the materials selected for use. For example, cold staking would deform the post through the application of high pressures. Cold flow subjects the post region to high stresses. Consequently, it is only suitable for use with the more malleable plastics. In thermostaking or hot air staking, heat is applied to the post by means of a stream of superheated air, delivered through a tube which surrounds the post. A separate cold probe then lowers to compress the post head. Thermostaking is a high speed, low cost process and due to its highly controllable nature, could be especially advantageous if the pallet design would require a decorative surface finish. In ultrasonic staking, the post is melted using ultrasonic energy supplied through a welding horn. With the continued pressure of the horn, the melted post material flows into a cavity within a boss tip to form the required head design. Cycle times are typically less than two seconds and welds may be performed with a hand-held welding head.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pallet comprising:
   an upper deck made of sheet molding compound;
   a lower deck made of sheet molding compound; and
   a plurality of members connecting the first and second decks together to form a pallet having a frame,
   wherein the sheet molding compound of the lower deck contains a mixture of between about 20 to about 40% by weight continuous unidirectional aligned fibers extending substantially the entire length of the frame, at least one of the unidirectional aligned fibers having a length of between about 40 to about 48 inches, and between about 10 to about 30% by weight randomly sized and oriented fibers.

2. The pallet of claim 1, wherein the lower deck comprises a substantially rectangular frame with longitudinally and laterally extending cross members having one or more integrated and outwardly protruding reinforcing ribs extending substantially parallel along the frame and cross members.

* * * * *